United States Patent
Sàrkar

(10) Patent No.: US 6,247,062 B1
(45) Date of Patent: Jun. 12, 2001

(54) METHOD AND APPARATUS FOR ROUTING RESPONSES FOR PROTOCOL WITH NO STATION ADDRESS TO MULTIPLE HOSTS

(75) Inventor: Shantanu Sàrkar, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/241,519

(22) Filed: Feb. 1, 1999

(51) Int. Cl.[7] .................................................. G06F 15/16
(52) U.S. Cl. ............................................ 709/245; 370/409
(58) Field of Search .................................. 709/245, 217, 709/227; 370/352, 409

(56) References Cited

U.S. PATENT DOCUMENTS

| | | |
|---|---|---|
| 5,388,213 | 2/1995 | Oppenheimer et al. . |
| 5,430,715 | 7/1995 | Corbalis et al. ........................ 370/54 |
| 5,790,548 * | 8/1998 | Sistanizadeh et al. ............... 370/401 |
| 5,793,763 | 8/1998 | Mayes et al. ......................... 370/389 |
| 5,835,725 | 11/1998 | Chiang et al. . |
| 5,867,495 * | 2/1999 | Elliott et al. ......................... 370/352 |
| 6,026,441 * | 2/2000 | Ronen ................................. 709/227 |
| 6,073,178 * | 6/2000 | Wong et al. .......................... 709/229 |
| 6,119,171 * | 9/2000 | Alkhatib .............................. 709/245 |
| B1 6,178,455 * | 1/2001 | Schutte et al. ........................ 709/228 |

OTHER PUBLICATIONS

ADT Security Services; http://www.adt.com/2homesec/a_monitr.htm; copyright 1999; p. 1.
ADT Security Services; http://www.adt.com/2homesec/b$_{13}$option.htm; copyright 1999; pp. 1–2.
ADT Security Services; http://www.adt.com/2homesec/d_procus.htm; copyright 1999; p. 1.
ADT Security Services; http://www.adt.com/2homesec/c_pr2000.htm; copyright 1999, pp. 1–2.
Tanenbaum, Andrew; Computer Networks, third edition; 1996; pp. 420–458.

* cited by examiner

*Primary Examiner*—Krisna Lim
(74) *Attorney, Agent, or Firm*—Cesari and McKenna, L.L.P.

(57) ABSTRACT

A method and apparatus for routing data through a network when the data is originally free of source and destination addresses is provided. A secondary router is interconnected to one or more polling hosts and a primary router is interconnected to a group of remote panels that generate status responses to the polling requests of the hosts. The hosts and panels are adapted normally to communicate via direct telephone interconnections in a security protocol that is generally free of data addresses. Communication occurs in an asynchronous manner. The routers are adapted to provide network layer source and destination addresses for transfer of the security polls and responses over the network based upon known information about the polling hosts and remote panels embedded in the security protocol data. Since the protocol is generally free of data regarding the polling host in the response, the primary router stores data related to the polling host for appending to the response as it is returned to the network to the secondary router. This host identity data is contained in a tunnel layer segment that is appended to the packet between the protocol layer segment and network layer segment. Using this host identity layer, the secondary router can forward the response back to the original polling host.

14 Claims, 5 Drawing Sheets

METHOD AND APPARATUS FOR ROUTING RESPONSES FOR PROTOCOL WITH NO STATION ADDRESS TO MULTIPLE HOSTS

FIELD OF INVENTION

This invention relates to computer networks and more particularly to routing of control and data packets through a computer network

BACKGROUND OF THE INVENTION

For many years homes and businesses have utilized communication systems that enable fire and security system information to be transferred between remote sites (homes, businesses, etc.) and a security host monitoring station. Security companies such as Diebold, Wells Fargo, Brinks and ADT maintain large numbers of centralized monitoring stations that continually monitor security systems for subscribing customers. Each company uses a particular set of digitized codes or protocols, often simple number sequences, to determine the particular status of a security system. These protocols are typically proprietary to the particular security company.

FIG. 1 illustrates a security system monitoring arrangement according to the prior art. This patent will refer generally to protocols used by the ADT Company. However, the techniques described herein are applicable to a variety of companies employing various protocols, both for security systems and for other types of data transmission. As shown, customers at remote locations have respective alarm panels 100 and 102. Each alarm panel 100 and 102 is connected to a respective bank of sensors 110 and 112. In practice, each sensor bank 110, 112 can comprise a large number of sensors, each having specialized functions, such as motion detectors, open-door switches, smoke detectors and the like. The sensors 110 and 112 communicate locally with the respective alarm panel 100 and 102, providing security information to each panel.

The alarm panels each include conventional circuitry that translate sensor information into digital status signals. A modem 120 and 122 is provided in each respective panel. This modem, or an equivalent telephone communication device, interconnects the panel with the Public Switched Telephone System (PSTN) 130. A dedicated telephone line can be used to provide a continuous connection for the panel. Alternatively, each modem can include appropriate answering functions and dialing functions to allow periodic calls to be placed by the panel over the PSTN and for receiving calls over the PSTN when the panel senses a ring signal.

The security company, at its monitoring site, maintains a hosts computer or other monitoring devices 140. The host computer is interconnected with the PSTN and 130 by its own internal telecommunications modem 142 or other device. Like the panel, it is configured to place and receive calls over the PSTN, or to operate on a dedicated line to communicate with each panel.

The communication by the host with each panel is further described with reference to FIG. 2. The monitoring station, via the host computer 140 continually checks the status of each alarm panel on its given list of subscribers generally in a round robin fashion. Typically, a post poll select function (200) is executed by the host computer for a selected panel. As such, a call or polling function reads the selected alarm panel (202) via the PSTN. In response to the poll select, the panel transmits a status signal (204). In general, the status signal includes various station/alarm panel address information as well as specific security system status data. For example, according to the ADT protocol, the digital number "03" indicates an "all clear" status. Other numbers may indicate a system malfunction or security breach. The protocol used to poll the panel, and to return status does not include an "address" or other identifier indicating the identity of the particular polling host. This is because direct calls over the PSTN are made to and from the alarm panel (e.g. the host's location is always known). The polling procedure shown in FIG. 1 occurs in round robin sequence throughout a group of alarm panels until all panels have been polled, and responses have been received therefrom. This is an asynchronous process in which a poll occurs at the host, and a status response is sent by the alarm panel at a short, but indefinite, time thereafter. Once all alarm panels on the host's subscriber list have been polled, and status received, the polling process repeats itself.

As noted, the information transferred from each alarm panel does not include particular addresses about its destination (e.g. returning to the host). This limits the ability of such information to be transferred over a distributed network such as the well-known Internet where source and destination address information is needed to appropriate route data. For information to be effectively routed over the Internet, an Internet Protocol (IP) source and destination address is generally needed within the transmitted data stream or "packet."

Accordingly, the object of this invention that provide a method and apparatus for enabling information that does not include source and destination addresses to be returned to a host from a remote source following a asynchronous polling of the source by the host for that information. This method and apparatus should enable the existing hosts and alarm panels (or other data devices) configured to operate free of IP layer addressing functions to be used without significant modification.

SUMMARY OF THE INVENTION

This invention overcomes the disadvantages of the prior art by providing a router system between a host and a set of alarm panels that enables routing of data therebetween over an Internet Protocol (IP) layer network when the data is originally adapted to be transferred asynchronously without network source and destination addresses, and more particularly without any identification of the polling host in the panel's response. This is accomplished by providing routers at the host side of the network and at the panel side of the network that each provide the required addresses and identifiers and append these addresses to data sent by both each host and each panel.

More particularly, a primary router is interconnected between a set of alarm panels and the IP network. Likewise, a secondary router is connected between one or more hosts and the IP network. In a typical polling operation, the secondary router identifies the particular host sending the polling signal. It then stores the host information, and based upon a panel address contained in the polling signal, appends an IP source and destination address to the polling signal. This source and destination address is developed based upon a prestored table within the secondary router that cross references the host protocol contained in the polling signal with a specific alarm panel connected to a specific primary router. The appended data packet is then transferred over the IP network to the primary router. The primary router receives the polling signal, and its protocol interface block stores the source and destination address of the secondary router from which the polling request came, and also stores a tunnel layer data segment containing the host's identity to later identify the polling host. The primary router then transmits the polling signal to the appropriate alarm panel (connected to the router via a port) based upon the station address contained within the protocol data of the packet. The poll generates an appropriate status response data code at the alarm panel. Note that this status response does not generally contain information about the identity of the polling host. This status response is returned to the primary router which, in turn, reappends a source and destination address (as network layer data) and the previously stored host identification data (as tunnel data). The protocol interface in the primary router then transmits the appended data packet back to the secondary router. At the secondary router the data is then stripped of addresses and forwarded to the host in a protocol form recognized by the host. In this manner, the host and alarm panel communicate with each other as if a direct telephone connection were in place, the network addressing being handled by the primary and secondary routers exclusively.

In a preferred embodiment, the primary and secondary routers are each provided with ports interconnected to alarm panels and hosts, respectively. The primary and secondary routers include line control blocks for controlling the flow of data through the ports and over asynchronous communication lines connected thereto. Storage areas are provided for storing information on the signal most recently sent over the line so that this information can be used when data returns over the same line. As data travels to and from the routers over an IP network, the data is provided with IP and tunnel information by an Asynchronous Security Protocol (ASP) functional block within each router. The ASP block consults a look-up table to determine appropriate IP addresses based upon underlying information contained in the security protocol segment of the data so that data can be directed over the IP network. In addition, the ASP block uses the incoming addressees of data as it arrives from the IP network to later determine the return path of the information.

BRIEF DESCRIPTION OF THE DRAWINGS

The foregoing and other objects and advantages of the invention will become more clear with reference to the following detailed description as illustrated by the drawing in which.

DETAILED DESCRIPTION OF AN ILLUSTRATIVE EMBODIMENT

Figure 1:
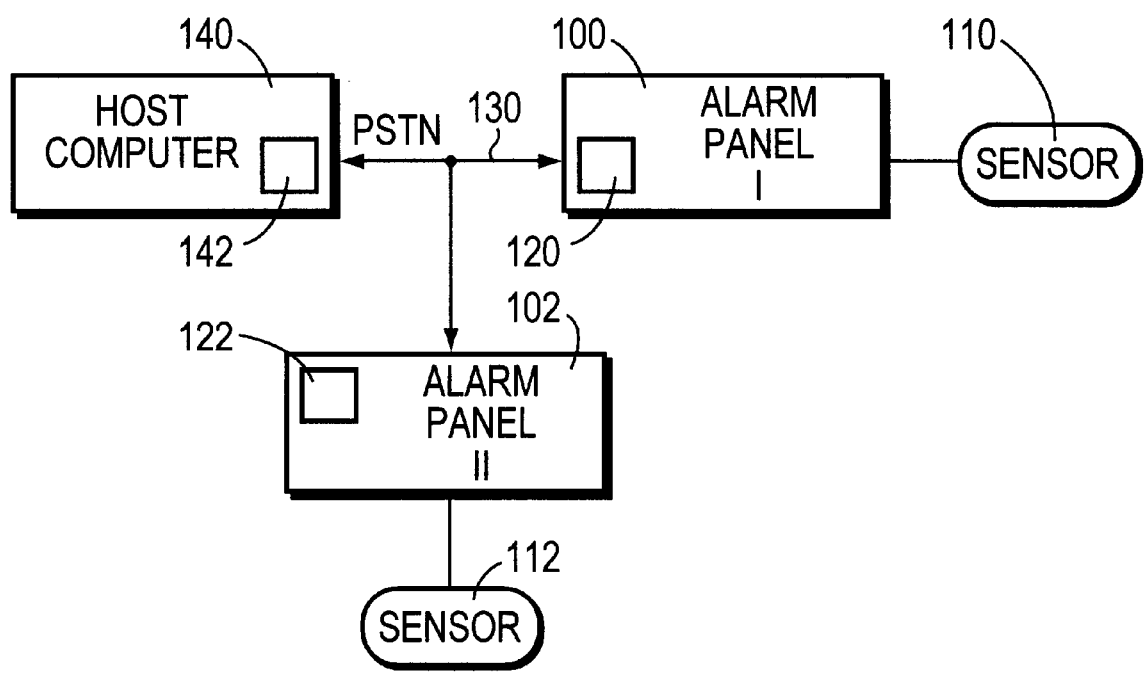
FIG. 1, already described, is a block diagram of a series of alarm panels joined to a host according to the prior art.
Figure 2:
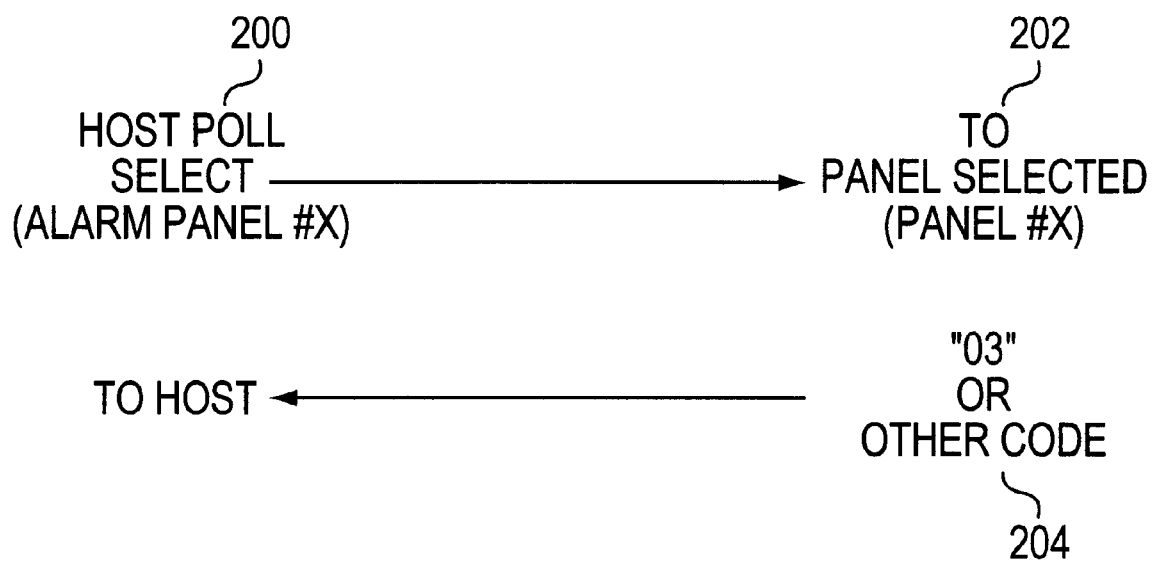
FIG. 2, already described, is a diagram of a polling procedure for obtaining status data from an alarm panel by a host according to prior art.
Figure 3:
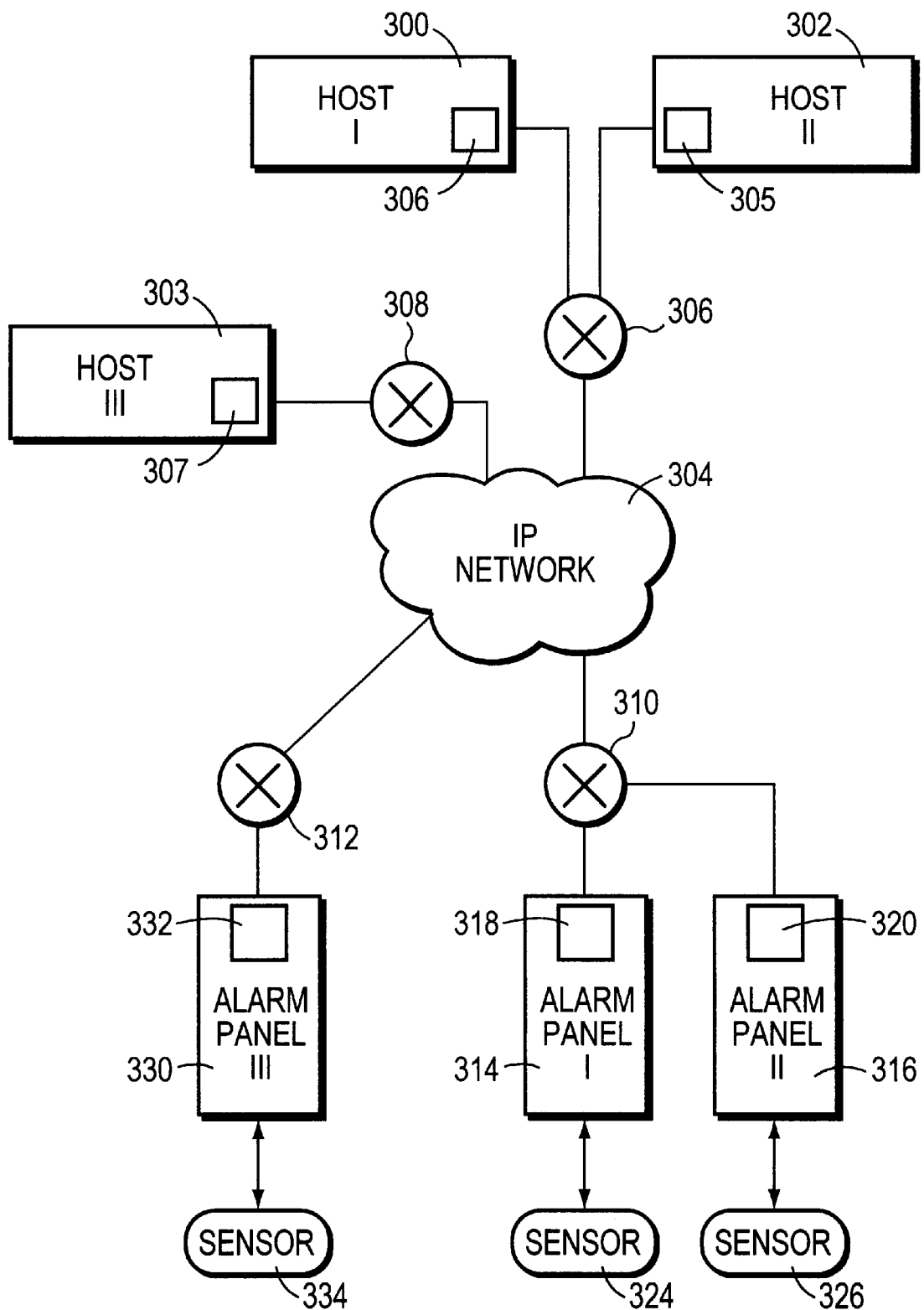
FIG. 3 is a block diagram of an IP network-based arrangement for obtaining status data from a group of alarm panels by a group of hosts.

FIG. 3 shows an arrangement of multiple hosts and remote alarm panels according to an embodiment of this invention. In general, the exemplary arrangement shows a first host 300, a second host 302 and a third host 303 each joined to IP Network 304 through respective secondary routers 306 (connecting routers 300 and 302) and 308 (connecting router 303). Each host 300, 302 and 303 can comprise a computer system or local area network. While it is contemplated that a host may have the capability of communicating over an IP network 304, it is assumed that it is configured strictly to send and receive the proprietary security system protocol data. In other words, each host can directly send data to and receive data from, via a telephone line interconnection, one or more preselected alarm panels. Each host 300, 302 and 303 may include a respective dialer or modem 305, 306 and 307 for this purpose. According to this embodiment, the telephone interface of each host is instead made to the dedicated secondary router 306, 308. In this manner the router is meant to act as the telephone system, and allows the host to communicate transparently. The routers, in turn, interconnect with the IP network 304.

In the exemplary arrangement of FIG. 3, a pair of primary routers 310 and 312 are also interconnected with the IP network. In turn, these primary routers are interconnected with alarm panels 314, 316 and 330 (router 310 connecting panels 314 and 316 and router 312 connecting panel 330). Each panel 314, 316, 330 communicates with its respective router using a respective conventional modem or telephone interface 318, 320, 332. The panels each monitor respective banks of sensors 324, 326, 334.

Based upon the monitoring, the panels generate status data (such as the ADT protocol "03" code signifying all clear). Each panel delivers this data based upon receipt of an appropriate polling request from the host. Like the host, the panels are configured to send and receive signals over a conventional telephone interconnection. This occurs free of addresses since the host is deemed to be know in the originally contemplated direct telephone connection. As such, the primary routers 310 and 312 are interconnected to the telephone interface of each panel so as to appear like a transparent telephone connection to each panel in both the transmission of status codes and receipt of polling requests.

Figure 4:
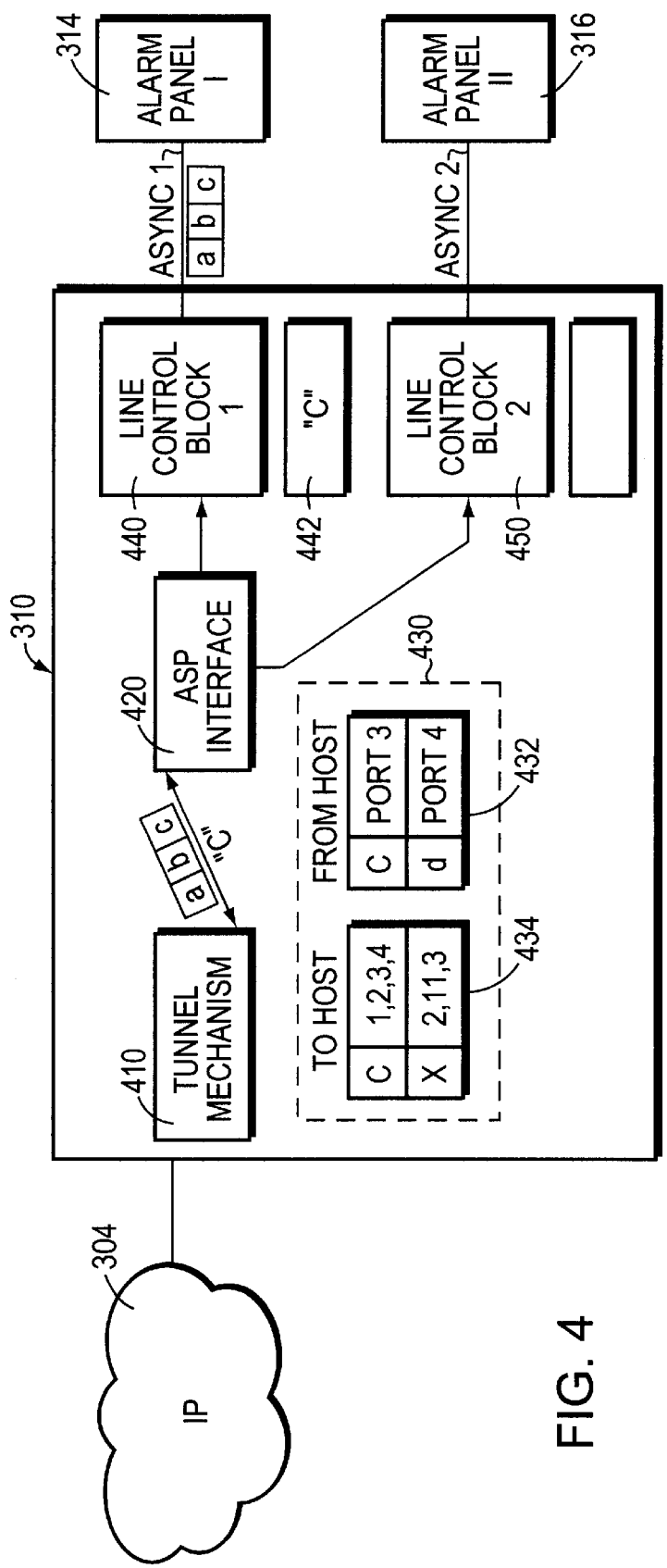
FIG. 4 is a block diagram of a primary router for use with the network of FIG. 3.

The function of the primary routers is now described with further reference to FIG. 4 in which the applicable portion of exemplary primary router 310 is shown in further detail. It can be assumed that the router 312 and any other associated routers in the network are similarly configured. The architecture of the secondary routers 306 and 308 and primary routers 310 and 312 can be largely conventional in structure and function. For example, the Cobra 25xx and 36xx series platforms available from Cisco Systems of San Jose, Calif. can be used. Likewise, the Cisco 4xxx series platform with a HARP card can be employed.

Figure 5:
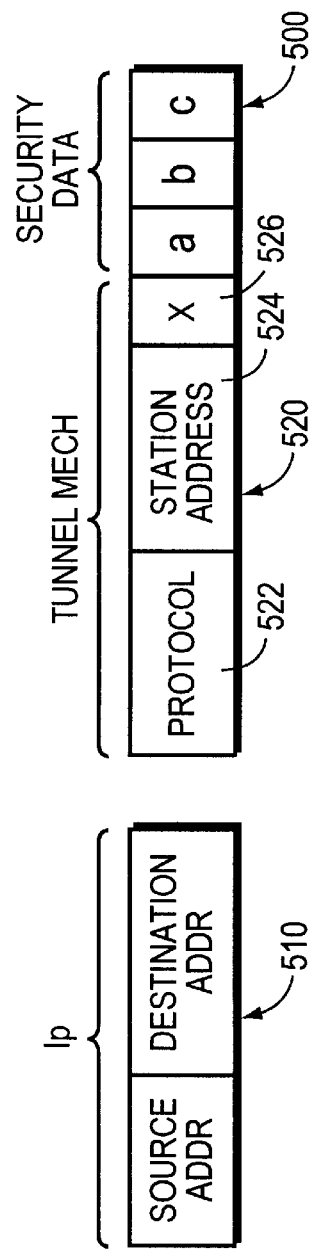
FIG. 5 is a diagram of a data packet in connection with alarm panel status data according to this invention.

From the IP network 304 the router 310 receives a data packet as illustrated in FIG. 5. The packet includes at least three layers of information. The bottom layer 500 comprises a security protocol data block. This is information that is formatted according to the particular security company protocol. In this example, segments a, b and c are shown. These codes remain unchanged throughout the transfer of information between the appropriate host and the alarm panel.

The packet received by the router also includes an IP layer source and destination address. In the case of a poll select signal received from the host. This IP layer address identifies the secondary router on the host side as the source and the primary router on the selected panel's side as the destination. These addresses are originally provided by the secondary router in a manner described further below. Appropriate conformations using, for example a TCP verification protocol can also be included.

A middle layer 520 of the data packet is also shown in FIG. 5. This data layer is related to the bisynchronous tunnel mechanism 420 provided in the primary router 310. The mechanism is configured to read a tunnel mechanism layer 520 that is also appended to the packet by the secondary router (again, described below). The tunnel mechanism layer 520 includes a protocol data segment 522 that identifies the particular security company protocol be utilized. A station address segment 524 is also provided. The station address identifies the particular alarm panel being polled. An additional control segment 526 can also be provided within the tunnel mechanism layer.

The tunnel mechanism retains the IP source and destination address of the particular packet received. As will be further below, this information will be used to return data from the selected alarm panel being polled.

The packet is transferred based upon an Asynchronous Security Protocol (ASP) interface functional block 420. This block reads the tunnel mechanism layer of the packet and selects the appropriate alarm panel based upon the station address and security data protocol content. A look-up table 430 is provided for determining routing of specific packets. For example, a table 432 is provided for packages from the host and another table 434 is provided packets transferred to the host. Each look-up table, shown by way of example herein, provides a cross reference between a specific packet segment code and a physical location to which the underlying protocol data (i.e. poll or response data) is to be directed. Based upon the data specified in the packet an appropriate physical port of the router (port 3 or port 4 in this example) is selected. These ports are interconnected with line control blocks 440 and 450. Each line control block functions specifically to store the last address transferred therethrough. In this example the address "c" is stored by the ASP block 420 in the storage area 442 of line control block 440. with respect to the selected asynchronous line ASYNC1 or ASYNC2. In other words, the packet is destined for the alarm panel 314. As noted above, each asynchronous line acts as a dedicated telephone line from the standpoint of the interconnected alarm panel. As the router IP source and destination addresses, as well as the tunnel data is stored and processed by the ASP block 420, this data is stripped from the packet, leaving the remaining security protocol data a/b/c to be transferred via the selected line control block (440 in the example) to the selected alarm panel (314 in the example).

In response to polling query, the exemplary selected alarm panel 314 transmits a security protocol status code ("03" for example). This status code is returned to the router 310 via the panel's communication line, interconnected with the router port via ASYNC1. The router 310 is configured to expect to receive a status response to the last-sent poll (i.e. an "asynchronous" response). Therefore, it automatically associates the address "c" with the return status signal transmitted over ASYNC1. In other words, the router assumes that the return status signal is from the selected alarm panel 314. This entails a recall of the stored "c" address from the line control block 440 storage area. The "c" address is used to associate the status response data with appropriate return addresses to the host via the secondary router. Based upon this address, the ASP block 420 recalls the IP layer address of the original poll and appends this address to the status response signal. This time, the IP source and destination addresses are reversed, since the packet is returning to the secondary router (306) in this example.

Additionally, the look-up table 434 for "to-host" addresses is accessed to recall the host's particular identity (i.e. whether host 300 or 302 is selected in this example). This tunnel mechanism data layer is then appended to the status response packet. The completed status response packet is then transferred with the appended source and destination address back to the selected host.

Figure 6:
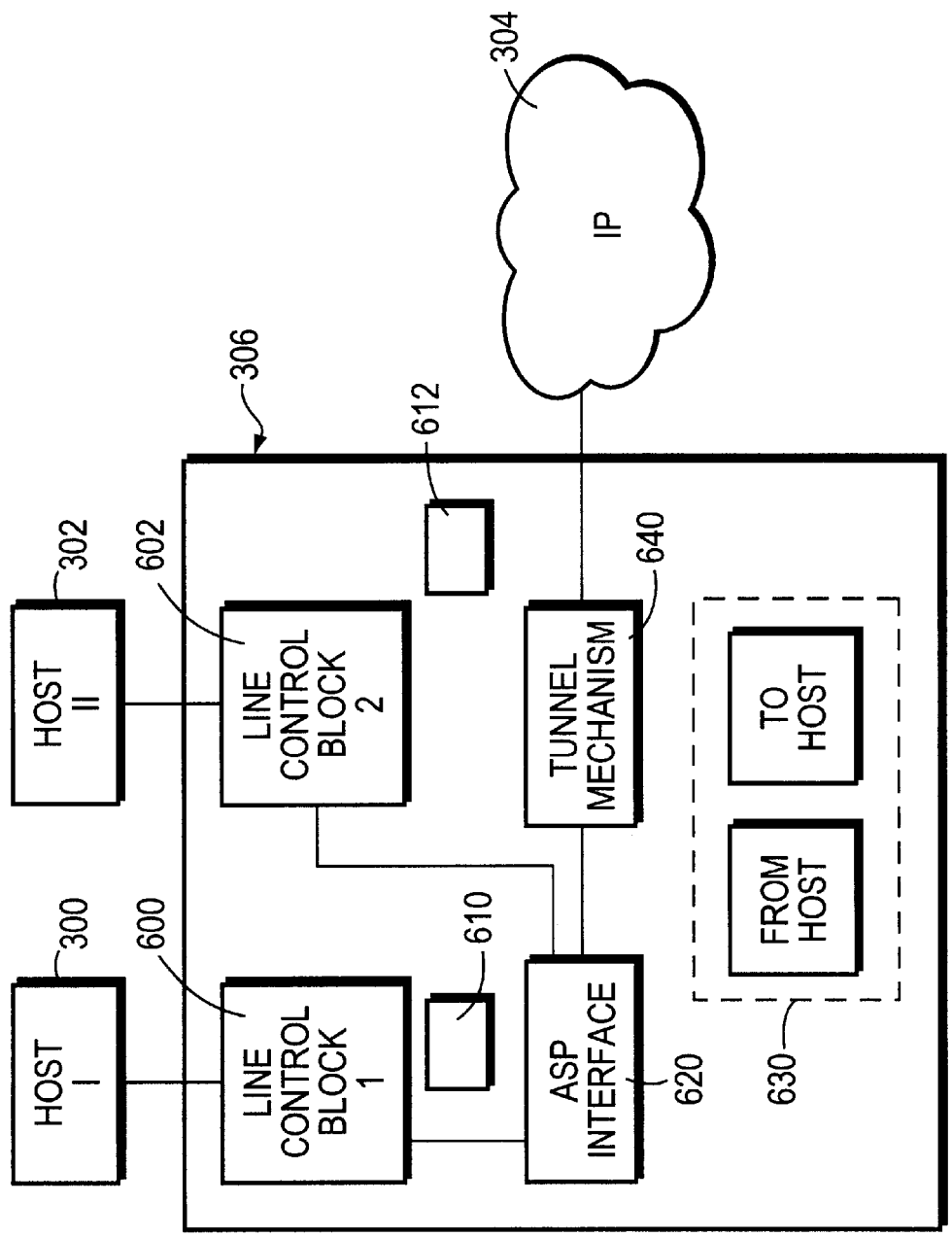
FIG. 6 is a block diagram of a secondary router for use with the network of FIG. 3.

With final reference to FIG. 6, the relevant functionality of the secondary router (306 in this example) is shown in further detail. As already discussed, this router is interconnected via a telephone line interface to hosts 300 and 302. Appropriate ports, controlled by line control blocks 600 and 602 are provided. Each block 600, 602 includes an address storage area 610, 612 that functions to retain appropriate address information about signals transferred through the block for subsequent return signal use. The ASP interface block 620 operates to append IP source and destination addresses to poll request packets based upon the selected alarm panel. The lookup table 630 can be used to determine the appropriate primary router for the underlying alarm panel being polled. This information is contained in the host's protocol data as it is received by the router 306 (e.g. the station address). Poll request signals are provided with both IP layer addresses and the tunnel layer address information, which includes particular information about the requesting host. The tunnel mechanism 640 is instructed by the ASP block to append the tunnel layer information. The assembled packet is transferred to the appropriate primary router as described above.

When status response data is returned to the secondary router 306, following a poll request, the packet is disassembled by the ASP block 620 and, based upon the tunnel mechanism layer data, the protocol data is forwarded to the appropriate host through the selected line control block. In practice, the entire poll and status return process should occur in a time frame relatively comparable to that of a direct line. Since it occurs asynchronously, there is an indefinite delay between poll and response, albeit a short delay.

Note that the number of ports and number of primary routers can be varied to accommodate a given number of alarm panels and/or hosts as needed. Routers are accessed based upon their particular IP layer address and associated alarm panels/hosts are contacted based upon the tunnel mechanism data and security protocol data contained in the transmitted data packet. The clear advantage of the system according to this embodiment is that any number of hosts and alarm panels can be interconnected by an IP network without the need of direct dedicated interconnections therebetween.

The foregoing has been a detailed description of a preferred embodiment of the invention. Various modifications and additions can be made without departing from the spirit and scope of the invention. For example, additional network layers, while not shown, can be provided to data packets transferred between the host and alarm panels. Alarm panels can be further organized into sub-networks with additional addressing requirements. In addition, while an ASP interface block is used to control security data routing, a variety of other control techniques can be employed. Finally, it should be clear that the processes carried out by the primary and secondary routers herein can be implemented using a variety of hardware-based circuits such as programmable logic arrays or application specific integrated circuits, and/or microprocessor/computer-based that execute computer readable media (e.g. software). The use of either hard ware, software or both to carry out the storage, processing and transfer functions described herein is expressly contemplated. Accordingly, this description is meant to be taken only by way of example and not to otherwise limit the scope of the invention

What is claimed is:

1. A method for transferring data between a host that generates polling requests and a remote panel that directs status data responses to the host based upon the polling requests over a network comprising the steps of:

provided a primary router between the panel and the network;

providing a secondary router between the host and the network;

transmitting a polling request for the panel to the secondary router;

identifying, based upon the polling request, in the secondary router the host and appending to the polling request a tunnel data corresponding to the identified host and the panel being polled based upon data in the polling request, and appending network source and destination information for, respectively, the secondary router and the primary router;

transmitting the appended polling request to the primary router;

receiving, at the primary router the polling request and transferring the polling request, based upon the tunnel data to the panel, including storing the tunnel data and the source information for the secondary router;

receiving, at the primary router from the panel, a status data response, based upon the polling request;

identifying, based upon the status data response, in the primary router, the host by accessing the tunnel data stored in the step of storing and appending to the status data response tunnel data corresponding to the host, and appending network source and destination information for, respectively, the primary router and the secondary router;

transmitting the appended status data response to the secondary router; and transferring the status data response to the host based upon the appended tunnel data.

2. The method as set forth in claim 1 wherein the step of identifying the host includes accessing a look-up table that cross references tunnel data and network source and destination addresses for the primary router.

3. The method as set forth in claim 2 wherein the step of transferring the polling request includes stripping the tunnel data and the network source and destination address from the appended polling request and transferring the stripped polling request to the panel.

4. The method as set forth in claim 3 wherein the step of transferring the status data response includes stripping the tunnel data and the network source and destination address from the appended status data response and transferring the stripped status data response to the host.

5. An apparatus for enabling communication between a host that generates polling requests and a remote panel that directs status data responses to the host based upon the polling requests over a network, the polling requests and the data responses each being formatted according to a predetermined protocol that is free of network source and destination addresses, comprising:

a primary router operatively connected between the remote panel and the network, the primary router including:

a protocol interface constructed and arranged to (1) read an incoming polling request having an appended network source and destination address with respect to the host, (2) strip the appended network source and destination address, (3) identify the remote panel to be polled based upon data in the polling request, and (4) direct the polling request to the remote panel;

a storage block for storing the stripped network source and destination address and for storing an identifier of the host based upon data in the polling request;

the protocol interface constructed and arranged to (1) receive and identify the data response of the remote panel and to access the storage block to, thereby, append an identifier indicating the host to the data response and append a network source and destination address, and to (2) transmit the appended data response to the host over the network.

6. The apparatus as set forth in claim 5 further comprising a secondary router operatively connected between the host and the network, the secondary router including a protocol interface for appending a source and destination address of the primary router based upon data related to the remote panel in the polling request of the host and for transmitting the appended polling request to the primary router.

7. The apparatus as set forth in claim 6 wherein the protocol interface of the secondary router is constructed and arranged to (1) identify an incoming data response from the network, (2) strip the network source and destination address therefrom and strip the identifier indicating the host therefrom and (3) transmit the stripped data response to the host.

8. The apparatus as set forth in claim 5 wherein the protocol interface includes a look-up table that cross references station address data in each polling request with a location of the remote panel and that cross references each data response with a location of the host.

9. The apparatus as set forth in claim 5 further comprising line control blocks interconnected to the protocol interface for accessing a plurality of asynchronous communication lines, at least one of the lines being interconnected with the remote panel.

10. A computer readable medium containing executable program instructions for executing a transfer of data between a host that generates polling requests and a remote panel that directs status data responses to the host based upon the polling requests over a network, the polling requests and the data responses each being formatted according to a predetermined protocol that is free of network source and destination addresses, the executable program instructions comprising program instructions for:

(1) reading an incoming polling request at a protocol interface of a primary router interconnected between the remote panel and the network, the polling request having an appended network source and destination address with respect to the host, (2) stripping the appended network source and destination address, (3) identifying the remote panel to be polled based upon data in the polling request, and (4) directing the polling request to the remote panel;

storing the stripped network source and destination address and an identifier of the host based upon data in the polling request;

(1) receiving and identifying the data response of the remote panel and accessing the storage block to, thereby, append an identifier indicating the host to the data response and append a network source and destination address, and (2) transmitting the appended data response to the host over the network.

11. The medium as set forth in claim 10 further comprising program instructions for appending a source and destination address of the primary router to the polling request in a protocol interface of a secondary router interconnected between the host and the network, the appending being based upon data related to the remote panel in the polling request of the host and transmitting the appended polling request to the primary router.

12. The medium as set forth in claim 11 further including program instructions for (1) identifying an incoming data response from the network at the secondary router, (2) stripping the network source and destination address therefrom and stripping the identifier indicating the host therefrom and (3) transmit the stripped data response to the host.

13. The medium as set forth in claim 10 further including program instructions for accessing, in the primary router, a look-up table that cross references station address data in each polling request with a location of the remote panel and that cross references each data response with a location of the host.

14. The medium as set forth in claim 10 further including instructions for accessing each of a plurality of asynchronous communication lines through each of corresponding line control blocks, at least one of the lines being interconnected with the remote panel.

* * * * *